(12) United States Patent
Kelly et al.

(10) Patent No.: US 10,328,942 B2
(45) Date of Patent: Jun. 25, 2019

(54) MOTOR VEHICLE CONTROLLER AND METHOD

(71) Applicant: Jaguar Land Rover Limited, Whitley, Coventry, Warwickshire (GB)

(72) Inventors: James Kelly, Solihull (GB); Alex Bean, Leamington Spa (GB); Paul Beever, Rugby (GB); Nick Brockley, Lichfield (GB); Jon Parr, Leamington Spa (GB); Jan Prins, Solihull (GB); Andrew Fairgrieve, Rugby (GB); Daniel Woolliscroft, Birmingham (GB); Charlotte Cooke, Haywards Heath (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 292 days.

(21) Appl. No.: 15/120,088

(22) PCT Filed: Feb. 12, 2015

(86) PCT No.: PCT/EP2015/052995
§ 371 (c)(1),
(2) Date: Aug. 18, 2016

(87) PCT Pub. No.: WO2015/124493
PCT Pub. Date: Aug. 27, 2015

(65) Prior Publication Data
US 2017/0057515 A1   Mar. 2, 2017

(30) Foreign Application Priority Data

Feb. 19, 2014 (GB) .................... 1402947.4

(51) Int. Cl.
*B60T 8/172* (2006.01)
*B60W 10/20* (2006.01)
(Continued)

(52) U.S. Cl.
CPC ....... *B60W 30/18172* (2013.01); *B60T 8/172* (2013.01); *B60T 8/1769* (2013.01);
(Continued)

(58) Field of Classification Search
CPC .... B60T 8/172; B60T 8/1769; B60W 40/068; B60W 10/06; G05D 1/021
(Continued)

(56) References Cited

U.S. PATENT DOCUMENTS 7,349,776 B2   3/2008 Spillane et al.
8,825,324 B2   9/2014 Horaguchi et al.
(Continued)

FOREIGN PATENT DOCUMENTS

DE   102007043599 A1   3/2009
DE   102011085984 A1   5/2013
(Continued)

OTHER PUBLICATIONS

A SRM Drive based Hybrid Electric Vehicle with Reduced Switch Converte; S.Roop Kumar ; D. Susitra; 2016 Online International Conference on Green Engineering and Technologies (IC-GET); pp. 1-7; EEE Conferences; ; Year: 2016.*
(Continued)

*Primary Examiner* — Cuong H Nguyen
(74) *Attorney, Agent, or Firm* — Reising Ethington P.C.

(57) ABSTRACT

A motor vehicle controller configured to: receive a drive demand signal indicating an amount of net drive to be applied to one or more driving wheels of a vehicle, estimate a value of a parameter indicative of a surface coefficient of friction between one or more driving wheels and a driving surface, and apply a net torque to one or more wheels of a vehicle. The amount of net torque applied is determined in dependence at least in part on the received drive demand signal. The controller is configured to increase an amount of
(Continued)

net torque applied to one or more driving wheels independently of the drive demand signal and to update an estimate of the parameter in dependence on a change in speed of the at least one driving wheel when the amount of net torque applied to the at least one driving wheel is increased.

18 Claims, 2 Drawing Sheets

(51) Int. Cl.
  B60W 30/18       (2012.01)
  B60T 8/1769      (2006.01)
  B60W 40/068      (2012.01)
  B60W 10/06       (2006.01)
  B60W 10/16       (2012.01)
  B60W 10/184      (2012.01)
  B60W 10/22       (2006.01)
  B60W 30/182      (2012.01)
  B60W 30/188      (2012.01)
  G05D 1/02        (2006.01)

(52) U.S. Cl.
  CPC .......... *B60W 10/06* (2013.01); *B60W 10/16* (2013.01); *B60W 10/184* (2013.01); *B60W 10/20* (2013.01); *B60W 10/22* (2013.01); *B60W 30/182* (2013.01); *B60W 30/188* (2013.01); *B60W 40/068* (2013.01); *G05D 1/021* (2013.01); *B60T 2201/14* (2013.01); *B60T 2210/12* (2013.01); *B60W 2520/10* (2013.01); *B60W 2520/26* (2013.01); *B60W 2550/141* (2013.01); *B60W 2550/148* (2013.01); *B60W 2710/1005* (2013.01); *B60W 2720/14* (2013.01); *B60W 2720/26* (2013.01); *B60W 2720/30* (2013.01)

(58) Field of Classification Search
  USPC .............................. 701/80, 82; 73/104–105
  See application file for complete search history.

(56) References Cited

U.S. PATENT DOCUMENTS

| | | | |
|---|---|---|---|
| 8,954,249 B2 | 2/2015 | Nakatsu et al. | |
| 9,475,395 B2 * | 10/2016 | Beever | B60W 30/02 |
| 2001/0029419 A1 * | 10/2001 | Matsumoto | B60T 8/172 |
| | | | 701/80 |
| 2003/0200016 A1 * | 10/2003 | Spillane | B60G 17/0195 |
| | | | 701/36 |
| 2005/0033499 A1 * | 2/2005 | Ekmark | B60T 8/172 |
| | | | 701/80 |
| 2007/0129871 A1 | 6/2007 | Post, II et al. | |
| 2007/0222285 A1 * | 9/2007 | Ribbens | B60T 8/1703 |
| | | | 303/139 |
| 2011/0257853 A1 | 10/2011 | Zeller et al. | |
| 2015/0175009 A1 | 6/2015 | Beever et al. | |
| 2015/0217770 A1 * | 8/2015 | Fairgrieve | B60K 31/02 |
| | | | 701/82 |

FOREIGN PATENT DOCUMENTS

| | | | |
|---|---|---|---|
| EP | 1355209 A1 | 10/2003 | |
| EP | 1481861 A1 | 12/2004 | |
| EP | 2612796 A1 | 7/2013 | |
| EP | 2617596 A1 | 7/2013 | |
| WO | WO2013186208 A2 | 12/2013 | |

OTHER PUBLICATIONS

Zero Torque Control for EV Coasting Considering Cross-Coupling Inductance; Heekwang Lee et al.; ; IEEE Transactions on Industrial Electronics; vol. 64, Issue: 8; pp. 6096-6104; Year: 2017.*
Lateral Stability Control Based on Active Motor Torque Control for Electric and Hybrid Vehicles; Isilay Yogurtçu Eet al; 2015 IEEE European Modelling Symposium (EMS); pp. 213-218; IEEE Conferences; Year: 2015.*
Coasting control of EV motor considering cross coupling inductance; Heekwang Lee et al.; 2016 IEEE Energy Conversion Congress and Exposition (ECCE); pp. 1-6; IEEE Conferences; year 2016.*
Combined Search and Examination Report for application No. GB1402947.4, dated Sep. 2, 2014, 5 pages.
International Search Report for International application No. PCT/EP2015/052995, dated May 6, 2015, 4 pages.
Written Opinion for International application No. PCT/EP2015/052995, dated May 6, 2015, 5 pages.

* cited by examiner

MOTOR VEHICLE CONTROLLER AND METHOD

TECHNICAL FIELD

The present invention relates to a motor vehicle and to a method of controlling a motor vehicle. In particular but not exclusively the invention relates to motor vehicles such as all-terrain vehicles (ATVs) for driving in off-road driving conditions.

BACKGROUND

It is known to provide a motor vehicle having a four wheel drive mode of operation in which motive power is supplied to each of two pairs of wheels of the vehicle. Motive power is supplied to the wheels by means of a driveline.

It is an aim of the present invention to address disadvantages associated with the prior art.

SUMMARY OF THE INVENTION

Embodiments of the invention may be understood with reference to the appended claims.

Aspects of the present invention provide a controller, a vehicle and a method.

In one aspect of the invention for which protection is sought there is provided a motor vehicle controller comprising:

means for receiving a drive demand signal indicative of an amount of net drive to be applied to one or more driving wheels of a vehicle;

means for estimating a value of a parameter indicative of a surface coefficient of friction between one or more driving wheels and a driving surface, surface_friction; and means for applying a net torque to one or more wheels of a vehicle, an amount of net torque applied being determined in dependence at least in part on the received drive demand signal, the controller being configured automatically to increase momentarily an amount of net torque applied to one or more driving wheels independently of the drive demand signal and to update an estimate of parameter surface_friction in dependence at least in part on a change in speed of said at least one driving wheel when the amount of net torque applied to said at least one driving wheel is increased.

The means for estimating a value of a parameter indicative of a surface coefficient of friction between one or more driving wheels and a driving surface, may estimate said value at least in part in dependence on an amount of net torque applied to one or more driving wheels and a speed of one or more driving wheels Some embodiments of the present invention have the advantage that the controller is able to monitor an amount of traction available at a driving wheel and update an estimate of a value of surface_friction in dependence on measurements of wheel speed when the amount of net torque applied to a wheel is automatically increased momentarily. Embodiments of the present invention have the advantage that a parameter indicative of an amount of available traction at a driving wheel, such as surface coefficient of friction between a wheel and a driving surface, may be updated relatively frequently and in a manner that does not adversely affect driver confidence in vehicle performance, or vehicle composure.

By change in speed of at least one driving wheel is included a comparison of a measurement of a speed of the driving wheel an increase in net torque has taken place and a measurement of a speed of the driving wheel before the increase in net torque has taken place.

It is to be understood that the drive demand signal may for example be a torque demand signal, a required wheel or vehicle speed, or a required vehicle or wheel acceleration. Other arrangements may also be useful.

Optionally the means for applying a net torque to one or more wheels of a vehicle comprises means for causing application of positive drive torque and negative brake torque to each of one or more driving wheels substantially simultaneously, the controller being configured automatically to increase momentarily an amount of net torque applied by momentarily reducing an amount of brake torque applied to one or more driving wheels to which positive drive torque and negative brake torque is being applied.

Embodiments of the present invention have the advantage that the controller is able to update an estimate of an amount of traction available at a driving wheel in a more rapid manner than in known controllers. This is because modulation of net torque at a driving wheel may be performed more quickly by means of a braking system than by means of a powertrain due to inertia in the response of one or more components of a powertrain, such as an internal combustion engine, to commanded changes in drive torque. By causing negative brake torque to act against positive drive torque provided by a powertrain, an amount of net torque applied to a driving wheel, being a wheel driven by the powertrain, may be increased more quickly by reducing the amount of brake torque than if an increase in powertrain torque were commanded instead.

It is to be understood that the torque demand signal may be a signal corresponding to driver demanded torque, for example from an accelerator pedal, or a signal generated by a speed control system.

It is to be understood that the controller may be arranged to calculate the maximum amount of torque that may be applied to a driving wheel before the amount of slip of the driving wheel exceeds a predetermined amount based on the current estimate of the value of surface coefficient of friction. The predetermined amount may be determined in dependence at least in part on surface coefficient of friction and vehicle speed. Accordingly, knowledge of the surface coefficient of friction may be important to controller operation.

The controller may be configured to arbitrate the torque demand signal, and command lower values of net torque to be applied to one or more driving wheels when surface_friction is relatively low, so as to prevent slip exceeding the predetermined amount. It is to be understood that, because arbitration of torque demand relies on the value of surface_friction, it is important to ensure that the value of surface_friction is updated frequently. It is to be understood that if the value of surface_friction employed by the controller is too low, the net driving torque commanded by the controller may be lower than that which the driving wheels are able to sustain without exceeding the predetermined slip value. Conversely if the value of surface_friction employed by the controller is too high, the net driving torque commanded by the controller may exceed that which the driving wheels are able to sustain without exceeding the predetermined slip value.

Optionally the means for applying a net torque to one or more wheels of a vehicle comprises means for controlling an amount of torque coupling between first and second axles of a vehicle, the controller being configured automatically to increase momentarily an amount of net torque applied to at least one driving wheel of a second axle at least in part by momentarily reducing an amount of torque coupling between the first and second axles of a vehicle.

It is to be understood that the first and second axles may be front and rear axles, respectively, of a four wheel drive vehicle having variable torque coupling between the front and rear axles. The front axle may be driven substantially directly by a transmission, whilst the rear axle may be drivably coupled to the transmission, for example via the front axle, upon demand. It is to be understood that when the rear axle is drivably coupled to the front axle, an amount of drive torque from the transmission to the front axle may be increased by decoupling the rear axle from the front axle, optionally by means of a power transfer unit (PTU) or rear drive unit (RDU) having a driveline disconnect capability.

Optionally the means for applying a net torque to one or more wheels of a vehicle comprises means for controlling an amount of torque coupling between respective wheels of an axle of a vehicle, the controller being configured automatically to increase momentarily an amount of net torque applied to at least one driving wheel of an axle at least in part by momentarily adjusting an amount of torque coupling between respective wheels of an axle.

The controller may be configured automatically to increase momentarily an amount of net torque applied to at least one driving wheel of an axle at least in part by momentarily reducing an amount of torque coupling between respective wheels of an axle.

In some embodiments, an axle may be operable in a cross-axle lock condition in which a resistance of the axle to relative rotation between wheels of the axle is increased relative to a released condition in which relative rotation is freely permitted. By reducing an amount of cross-axle lock, in some circumstances an amount of net torque applied to one driving wheel of the axle may be momentarily increased. For example, if respective wheels of an axle experience different values of surface_friction and the amount of cross-axle lock is reduced, the net torque applied to the wheel experiencing the higher value of surface_friction may increase.

It is to be understood that some drivelines may be operable to vary the amount of cross-axle lock over a range of values from substantially no cross-axle lock to substantially full cross-axle lock in which relative rotation of wheels of a vehicle is substantially prevented. Alternatively some drivelines may be operable in a binary manner in which cross-axle lock is either enabled (substantially preventing relative rotation between wheels of an axle) or disabled (allowing relative rotation between wheels of an axle with relatively little resistance).

Optionally the controller may be configured to determine the amount of net torque to be applied to one or more driving wheels in dependence at least in part on the torque demand signal and the value of surface_friction.

Thus, the controller may be configured to arbitrate the value of net torque applied. That is, the controller may command a lower value of net torque than that indicated by the torque demand signal if it is determined that the amount of torque indicated by the torque demand signal is too high.

The controller may be configured to determine the amount of net torque to be applied to one or more driving wheels such that an amount of slip of one or more driving wheels is substantially equal to a predetermined amount.

The controller may be configured wherein the predetermined amount is determined in dependence at least in part on the value of surface_friction and a speed of a vehicle.

The predetermined amount may be determined by means of a mathematical equation, by means of a look-up-table or by any other suitable means.

It is to be understood that the speed of the vehicle may be determined by the controller in direct dependence on signals indicative of a speed of each wheel of a vehicle, for example a speed of a second slowest turning wheel, a mean speed of each wheel, or any other suitable method. In some embodiments a vehicle reference speed signal may be received by the controller, for example via a controller area network such as a controller area network (CAN) bus. In some embodiments a brake controller of a vehicle such as an anti-lock braking system (ABS) controller may be employed to generate the reference speed signal. The reference speed signal may be communicated to the controller by means of the controller area network.

In one aspect of the invention for which protection is sought there is provided a control system comprising a controller according to another aspect.

The control system may be configured to determine the amount of net torque to be applied to one or more driving wheels in dependence at least in part on information indicative of a terrain over which a vehicle is driving.

The control system may be configured to receive information indicative of a terrain over which a vehicle is driving by receiving a signal indicative of the identity of an operating mode in which a vehicle is operating, the operating mode being selected from a plurality of operating modes.

The control system may be configured wherein the operating modes are control modes of at least one subsystem of a vehicle, the control system having a subsystem controller for initiating control of a vehicle subsystem in the selected one of the plurality of subsystem control modes, each one of the operating modes corresponding to one or more different driving conditions for a vehicle.

The control modes may for example include a control mode on which the subsystems are configured for different terrain types, such as a control mode for travel over grass, a control mode for travel over muddy terrain and/or a control mode for travel over sand.

The control system may comprise evaluation means for evaluating one or more driving condition indicators to determine the extent to which each of the subsystem control modes is appropriate.

The evaluation means may be comprised by the automatic operating mode selection means.

The control system may be operable in an automatic operating mode selection condition in which the system is configured automatically to control the subsystem controller to initiate control of the or each subsystem in the subsystem control mode which is most appropriate.

Optionally, in each operating mode the system is configured to cause each one of a plurality of vehicle subsystems to be operated in a subsystem configuration mode appropriate to the driving condition.

Optionally the operating modes may include one or more control modes selected from the following:

control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

In one aspect of the invention for which protection is sought there is provided a motor vehicle comprising a control system according to another aspect.

In one aspect of the invention for which protection is sought there is provided a vehicle comprising a chassis, a body attached to said chassis, a plurality of wheels, a powertrain to drive said wheels, a braking system to brake said wheels, and a system according to another aspect.

In one aspect of the invention for which protection is sought there is provided a method of controlling a motor vehicle comprising:

receiving a torque demand signal indicative of an amount of net torque to be applied to one or more driving wheels of a vehicle;

estimating a value of a parameter indicative of a surface coefficient of friction between one or more driving wheels and a driving surface, surface_friction, at least in part in dependence on a net torque applied to one or more driving wheels and a speed of one or more driving wheels; and applying a net torque to one or more wheels of a vehicle, an amount of net torque applied being determined in dependence at least in part on the received torque demand signal, the method comprising automatically increasing momentarily an amount of net torque applied to one or more driving wheels independently of the torque demand signal and updating an estimate of parameter surface_friction in dependence at least in part on a change in speed of said at least one driving wheel when the amount of net torque applied to said at least one driving wheel is increased.

In one aspect of the invention for which protection is sought there is provided a method of controlling a motor vehicle comprising:

receiving a torque demand signal indicative of an amount of net torque to be applied to one or more driving wheels of a vehicle;

estimating a value of a parameter indicative of a surface coefficient of friction between one or more driving wheels and a driving surface, surface_friction, at least in part in dependence on a net torque applied to one or more driving wheels and a speed of one or more driving wheels, and causing automatically application of positive drive torque and negative brake torque to each of one or more driving wheels substantially simultaneously, an amount of net torque applied to one or more driving wheels being determined in dependence at least in part on the received torque demand signal, whereby when causing automatically application of positive drive torque and negative brake torque substantially simultaneously to one or more wheels, the method comprises momentarily reducing an amount of brake torque applied to one or more driving wheels to which positive drive torque and negative brake torque is being applied and updating an estimate of parameter surface_friction in dependence at least in part on a change in speed of at least one driving wheel when the amount of brake torque applied to the at least one driving wheel is reduced.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

It is to be understood that reference to slip of a wheel is reference to slip of a wheel over ground. Slip of a wheel over ground may be determined to be occurring when a speed of a wheel exceeds a vehicle reference speed, the vehicle reference speed being taken to correspond to a speed of a vehicle over ground. The vehicle reference speed may be calculated by any suitable means, for example by reference to a speed of a slowest turning wheel, reference to a speed of a second slowest turning wheel, reference to an average wheel speed, reference to image data provided by a camera device, and/or by reference to data obtained by means of a radar system or ultrasonic transmit/receive system. Other arrangements are also useful.

It is to be understood that by reference to an axle of a vehicle is meant reference to a given transverse pair of wheels such as a front pair of wheels or a rear pair of wheels, whether or not the wheels of a transverse pair are connected.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which.

DETAILED DESCRIPTION

Figure 1:
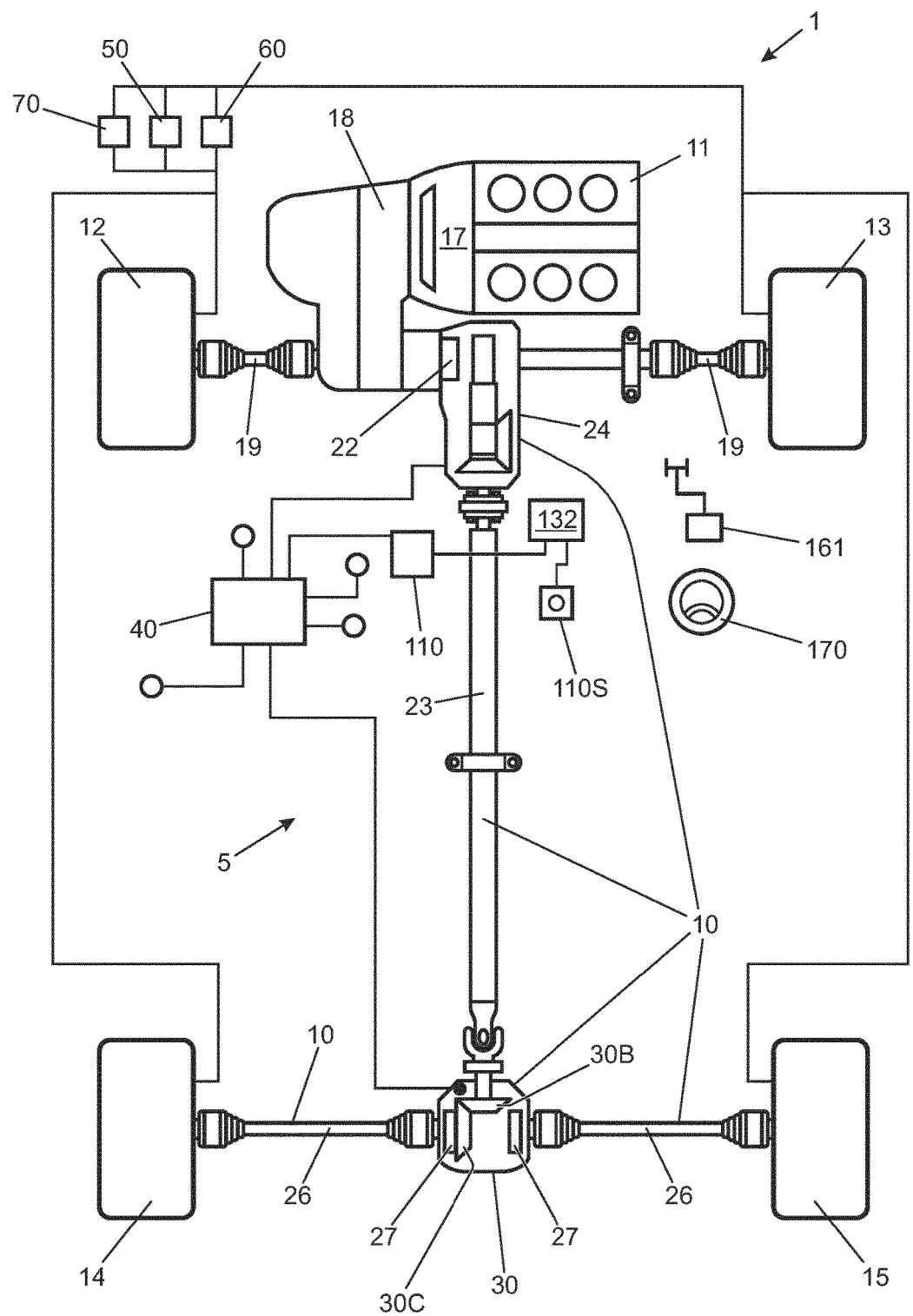
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19. The front drive shafts 19 in combination with front wheels 12, 13 may be referred to as a front axle 19F portion of the driveline 5.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18.

The prop shaft 23 is coupled in turn to a rear drive unit (RDU) 30 operable to couple the prop shaft 23 to the rear drive shafts 26.

The RDU 30 (FIG. 1) has a pair of clutches 27 by means of which the RDU 30 is operable to connect the prop shaft 23 to the rear drive shafts 26 when the four wheel drive mode of operation is required. An input shaft of each of the clutches 27 is driven by a crown wheel 30c which is in turn driven by a bevel gear 30b that is fixedly coupled to the prop shaft 23. The rear drive shafts 26 in combination with RDU 30 and rear wheels 14, 15 may be referred to as a rear axle portion 19R of the driveline 5.

The controller 40 of the driveline 5 is arranged to control operation of the PTU 24 and clutches 27 of the RDU 30. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller.

In the embodiment of FIG. 1 the PTC 22 and differential clutches 27 have respective actuators operable to close the respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the closed (or 'fully closed') condition. In the case of a multi-plate wet clutch the maximum amount of torque the clutch can transmit may be responsive at least in part to an amount of pressure applied to the plates of the clutch to maintain the clutch in the closed condition.

It is to be understood that in the present embodiment the controller 40 is operable to control the driveline 5 to assume the four wheel drive mode responsive to a selection of a required vehicle operating mode or characteristic by a driver, or automatically, in response to a value of one or more vehicle operating parameters.

In the present embodiment, if the driveline 5 is in the two wheel drive mode and the controller 40 detects that front wheels 12, 13 of the vehicle 1 are suffering spin exceeding a prescribed amount, for example due to an oversupply of torque for the prevailing surface conditions, the controller may control the driveline 5 automatically to assume the four wheel drive mode. This allows the rear wheels 14, 15 to drive the vehicle in addition to the front wheels 12, 13 and thereby promote motion of the vehicle 1 over a driving surface.

The vehicle 1 is provided with an antilock braking system (ABS) controller 50 arranged to control a brake of one or more wheels of the vehicle 1 to reduce an amount of braking action when required in order to prevent skidding. The vehicle 1 also has a dynamic stability control system (DSC) controller 60 arranged to control an amount of torque delivered to one or more wheels of the vehicle 1 to assist a vehicle in maintaining a desired path over ground. The DSC may also be referred to as an electronic stability control (ESC) system. Furthermore, the vehicle 1 has a traction control system (TCS) controller 70 arranged to monitor a speed of driven wheels of the vehicle 1 and an actual speed of the vehicle over ground. The TCS controller 70 is configured to detect wheel slip due to a speed of a wheel exceeding the speed of the vehicle over ground. If the amount of wheel slip exceeds a predetermined value the TCS controller 70 commands a reduction in an amount of net torque applied to the wheel by application of a brake to the wheel or by reducing the amount of powertrain torque applied to the wheel. It is to be understood that in some embodiments the functions of two or more of the ABS controller 50, DSC controller 60 and TCS controller 70 may be provided by a single control module rather than separate modules. The functions of two or more the controllers 50, 60, 70 may be provided by a single control module executing software code that implements the functions, optionally employing software partitioning.

Figure 2:
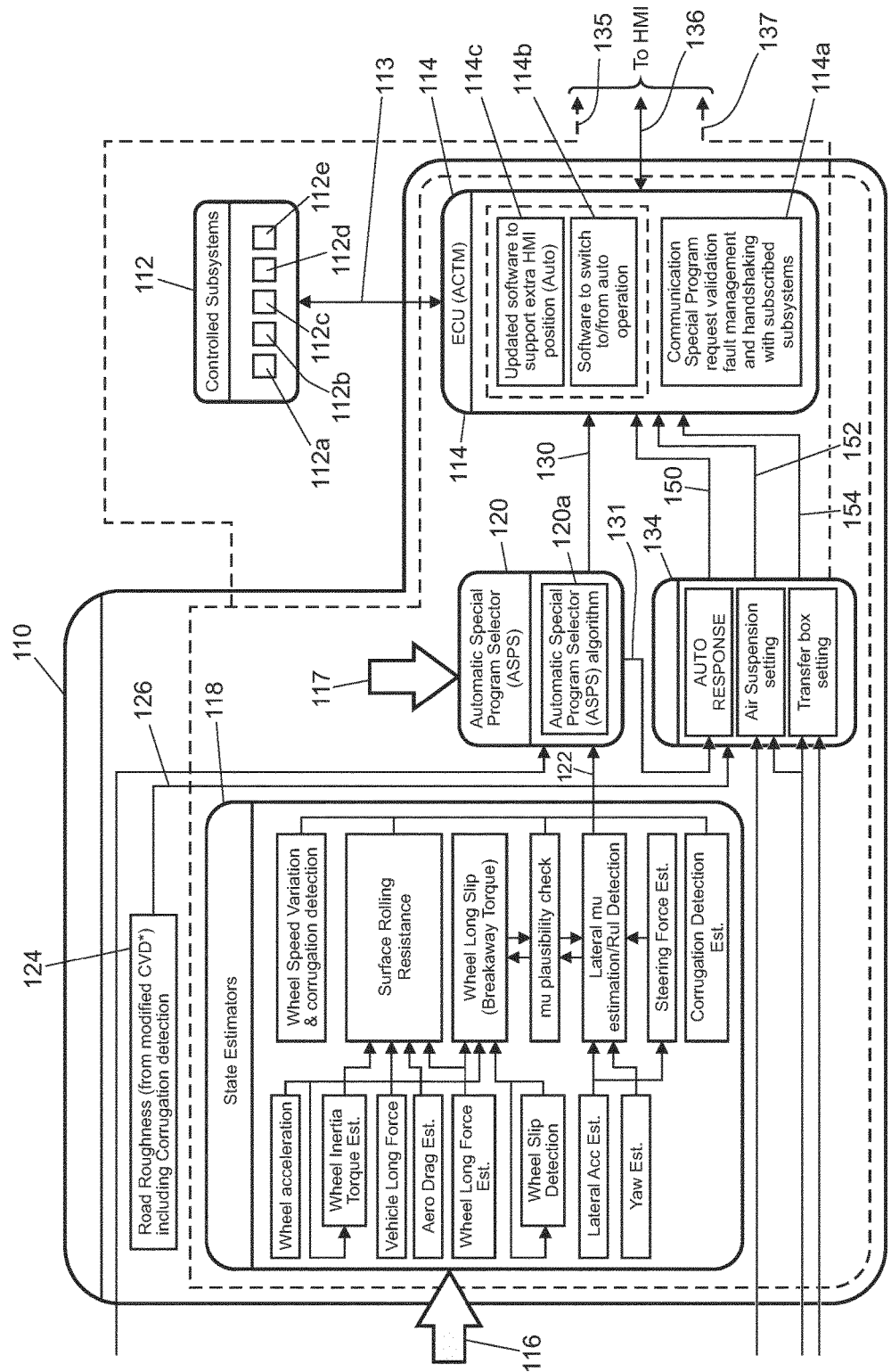
FIG. 2 is a schematic illustration of a portion of a control system of the vehicle according to the embodiment of FIG. 1.

The vehicle 1 of FIG. 1 has a vehicle control unit (VCU) 110. FIG. 2 shows the VCU 110 in more detail. The VCU 110 is operable to control a plurality of vehicle subsystems 112 including, but not limited to, an engine management system 112a, a transmission system 112b, an electronic power assisted steering unit 112c (ePAS unit), a brakes system 112d that includes ABS controller 50 and a suspension system 112e. Although five subsystems 112 are illustrated as being under the control of the VCU 110, in practice a greater number of vehicle subsystems 112 may be included on the vehicle and may be under the control of the VCU 110. The VCU 110 includes a subsystem control module 114 which provides control signals via line 113 to each of the vehicle subsystems 112 to initiate control of the subsystems 112 in a manner appropriate to the driving condition, such as the terrain or driving surface, in which the vehicle is travelling (referred to as the terrain condition). The subsystems 112 also communicate with the subsystems control module 114 via signal line 113 to feedback information on subsystem status.

As described in more detail below, the VCU 110 is operable to control the subsystems 112 to operate in one of a plurality of control modes, which may also be referred to as driving modes or terrain response (TR) modes. In each control mode, each subsystem is caused to assume one of a plurality of subsystem configuration modes. The control modes include a grass/gravel/snow control mode (GGS mode) that is suitable for when the vehicle is travelling over grass, gravel or snow terrain, a mud/ruts control mode (MR mode) which is suitable for when the vehicle is travelling over mud and ruts terrain, a rock crawl/boulder mode (RB mode) which is suitable for when the vehicle is travelling over rock or boulder terrain, a sand mode which is suitable for when the vehicle is travelling over sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

A user may select a required control mode by means of control mode selector 110S shown in FIG. 1. The selector 110S is in the form of a dial that may be rotated to select the appropriate control mode. Systems implementing this functionality are known, and are described for example in U.S. 2003/0200016, the content of which is hereby incorporated by reference.

In addition to allowing manual section of a required control mode, the VCU 110 is also configured to determine automatically an appropriate control mode when the VCU 110 is placed in an automatic mode selection mode or condition as described further below.

The VCU 110 receives a plurality of signals, represented generally at 116 and 117, from a plurality of vehicle sensors and are representative of a variety of different parameters associated with vehicle motion and status. As described in further detail below, the signals 116, 117 provide, or are used to calculate, a plurality of driving condition indicators (also referred to as terrain indicators) which are indicative of the nature of the terrain in which the vehicle is travelling. One advantageous feature of some embodiments of the present invention is that the VCU 110 determines the most appropriate control mode for the various subsystems on the basis of the terrain indicators, and automatically controls the subsystems accordingly.

The sensors (not shown) on the vehicle may include, but are not limited to, sensors which provide continuous sensor outputs 116 to the VCU 110, including wheel speed sensors, an ambient temperature sensor, an atmospheric pressure sensor, tyre pressure sensors, inertial sensors to detect yaw, roll and pitch rates of the vehicle and longitudinal, lateral, and vertical acceleration, a vehicle speed sensor, an engine torque sensor (or engine torque estimator), a steering angle sensor, a gradient sensor (or gradient estimator), a brake pedal position sensor and an accelerator pedal position sensor.

In other embodiments, only a selection of the aforementioned sensors may be used. The VCU 110 also receives a signal from the electronic power assisted steering unit (ePAS unit 112c) of the vehicle 1 to indicate the steering force that is applied to the wheels (steering force applied by the driver combined with steering force applied by the ePAS unit 112c).

The vehicle 1 is also provided with a plurality of sensors which provide discrete sensor outputs 117 to the VCU 110, including a cruise control status signal (ON/OFF), a transfer box or PTU status signal 137 (indicating whether a gear ratio of the PTU 137 is set to a HI range or a LO range), a Hill Descent Control (HDC) status signal (ON/OFF), a trailer connect status signal (ON/OFF), a windscreen wiper signal (ON/OFF), an air suspension status signal (HI/LO), a DSC signal (ON/OFF) and a TCS signal (ON/OFF). It is to be understood that the DSC and TCS signals each provide an indication as to whether the DSC or TCS systems 60, 70 are currently intervening to cause application of brake torque and/or powertrain torque, as appropriate, to improve vehicle stability or traction.

The VCU 110 includes an evaluation means in the form of an estimator module or processor 118 and a calculation and selection means in the form of a selector module or processor 120. Initially the continuous outputs 116 from the sensors are provided to the estimator module 118 whereas the discrete signals 117 are provided to the selector module 120.

Within a first stage of the estimator module 118, various ones of the sensor outputs 116 are used to derive a number of terrain indicators. Also in the first stage of the estimator module 118, a vehicle speed is derived from the wheel speed sensors, wheel acceleration is derived from the wheel speed sensors and the longitudinal force on the wheels is derived from the vehicle longitudinal acceleration sensor. A value of a critical torque at which wheel slip occurs is derived from the motion sensors to detect yaw, pitch and roll. This critical torque value may be defined as the torque at which the wheels will start to spin and may be calculated from the torque applied to the wheel(s) less an amount of torque corresponding to the torque required to accelerate the wheel(s) at the observed rate. Other calculations performed within the first stage of the estimator module 118 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 118 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, DSC/TCS activity and a signal indicative of whether wheel slip has occurred), lateral friction (calculated from the measured lateral acceleration and yaw versus the predicted lateral acceleration and yaw), and corrugation detection (high frequency, low amplitude wheel height excitement indicative of a washboard type surface).

On the basis of the windscreen wiper signal (ON/OFF), the estimator module 118 also calculates how long the windscreen wipers have been in an ON state (i.e. a rain duration signal).

The VCU 110 also includes a road roughness module 124 for calculating the terrain roughness based on the air suspension sensors (the ride height sensors) and the wheel accelerometers. A terrain indicator signal in the form of a roughness output signal 126 is output from the road roughness module 124.

The estimates for the wheel longitudinal slip and the lateral friction estimation are compared with one another within the estimator module 118 as a plausibility check.

Calculations for wheel speed variation and corrugation output, the surface rolling resistance estimation, the wheel longitudinal slip and the corrugation detection, together with the friction plausibility check, are output from the estimator module 118 and provide terrain indicator output signals 122, indicative of the nature of the terrain in which the vehicle is travelling, for further processing within the VCU 110.

The terrain indicator signals 122 from the estimator module 118 are provided to the selector module 120 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 122, 126 from the estimator module 118 and the road roughness module 124.

As noted above, the vehicle subsystems 112 may be controlled automatically (referred to as the "automatic mode") in response to a control output signal 130 from the selector module 120 and without the need for driver input. Alternatively, the vehicle subsystems 112 may be operated in response to a manual driver input (referred to as "manual mode"), the input being provided by means of a selector 110S. The subsystem controller 114 may itself control the vehicle subsystems 112a-112e directly via the signal line 113, or alternatively each subsystem may be provided with its own associated intermediate controller for providing control of the relevant subsystem 112a-112e. In the latter case the subsystem controller 114 may only control the selection of the most appropriate subsystem control mode for the subsystems 112a-112e, rather than implementing the actual control steps for the subsystems. The or each intermediate controller may in practice form an integral part of the main subsystem controller 114.

The manner in which the VCU 110 selects the most appropriate subsystem control mode when operating in the automatic mode is described in GB2492655, the content of which is incorporated herein by reference.

When operating in the four wheel drive mode with PTC 22 closed and clutches 27 of RDU 30 configured to transmit drive torque to the rear wheels 14, 15, the driveline controller 40 monitors a speed of each of the wheels 12-15 of the vehicle 1 based on the wheel speed signals generated by the wheel speed sensors.

In the present embodiment the TCS controller 70 is configured to perform a mu-check operation in which the controller 70 causes automatically a momentary increase in net torque applied to one or more driving wheels of the vehicle 1. This may coincide with torque reduction or braking being applied to other wheels to minimise disturbance to vehicle motion. When the increase in net torque takes place the controller 70 monitors wheel speed and estimates an upper limit of surface coefficient of friction between the one or more driving wheels and a driving surface in dependence on a change in speed of a wheel when the amount of net torque applied to a wheel momentarily increases.

In some embodiments the mu-check operation is performed repeatedly when the vehicle 1 is operating in a prescribed one or more driving modes. Other time periods and other arrangements are also useful. In some embodiments the mu-check operation is performed for a prescribed time period following a traction control event in which the TCS controller 70 intervenes to reduce an amount of net torque applied to a wheel when wheel slip exceeds a TCS intervention (or activation) threshold.

In some embodiments the mu-check operation is performed only when an estimated value of surface coefficient of friction in respect of a given wheel is less than a trigger value trigger_value, which may for example have a value of 0.5, 0.3 or any other suitable value. When such conditions are detected, the controller 70 repeatedly checks whether the value of surface coefficient of friction may be increased by automatically performing the mu-check operation. In the present embodiment, under these conditions the mu-check operation is performed repeatedly when with a time period of 15s between mu-check operations. Once the value of surface coefficient of friction exceeds a terminate value, the controller 70 terminates performance of the mu-check operation. The terminate value may be any suitable value such as 0.6, 0.7 or any other suitable value. Other intervals between mu-check operations may also be useful such as 10s, 30s, 60s or any other suitable value.

In some embodiments, the controller 70 is configured to perform the mu-check operation by applying a predetermined amount of brake pressure to one or more wheels via a braking system and causing the engine 121 to compensate for the decrease in net torque applied to the one or more wheels by applying a correspondingly larger amount of drive torque to oppose the brake force applied. It is to be understood that the controller 70 is configured such that a net drive torque applied to driving wheels of the vehicle remains substantially equal to the amount demanded by a driver or speed control system if a speed control system is active.

The controller 70 then performs the mu-check operation by automatically causing a momentary reduction in an amount of brake pressure applied to a brake of one driving wheel in order to increase a net torque applied to that driving wheel. The controller 70 monitors a speed of the driving wheel when the net torque applied increases and determines whether wheel slip occurs, in which a speed of rotation of the wheel exceeds a predetermined value. If wheel slip occurs, the controller 70 estimates the value of surface coefficient of friction based on the amount of net torque applied to the wheel when wheel slip occurred. If wheel slip does not occur, the controller 70 revises the estimate of surface coefficient of friction based on the value of net torque applied to the wheel when the amount of brake force applied was reduced.

In some embodiments, prior to performing a mu-check operation the controller 70 is configured to calculate a maximum amount of net torque that may be applied to a wheel before wheel slip exceeding a predetermined amount is expected, based on the current estimated value of surface coefficient of friction. The controller 70 then performs a mu-check operation in which the controller 70 causes the amount of net torque applied to a driving wheel to exceed the calculated maximum amount by a predetermined amount in order to check whether the estimated value of surface coefficient of friction is correct. The predetermined amount may be any suitable amount such as a predetermined proportion of the calculated maximum amount of net torque that may be applied, such as 5%, 10%, 20% or any other suitable value. Alternatively the predetermined amount may be a substantially fixed amount such as 20 Nm, 40 Nm, 50 Nm or any other suitable amount.

It is to be understood that if the amount of net torque applied exceeds the calculated maximum amount, the controller 70 may revise upwardly the current estimated value of surface coefficient of friction.

In some embodiments, instead of applying brake torque to oppose positive powertrain drive torque, and modulating the amount of brake torque applied, the controller 70 may perform the mu-check operation by momentarily reducing an amount of torque coupling between front and rear axles 19F, 19R if the vehicle 1 is operating in the four wheel drive mode in which front and rear axles 19F, 19R both provide drive torque. In some embodiments, the controller 70 achieves this by causing the driveline controller 40 momentarily to open PTC 22 without reducing the amount of drive torque developed by the engine 121. It is to be understood that opening of the PTC 22 causes drive torque developed by the engine 121 no longer to be shared between front and rear axles 19F, 19R. Rather the drive torque is delivered substantially solely to the front axle, resulting in an increase in the amount of drive torque applied to front wheels 12, 13 of the vehicle 1. In some embodiments, in addition to or instead of opening PTC 22 the driveline controller 40 may be configured to cause clutches 27 to open. This results in a similar increase in the amount of torque applied to wheels 12, 13 of the front axle 19F.

In a still further embodiment, the controller 70 may cause a momentary increase in an amount of net torque applied to one or more wheels by reducing an amount of torque coupling between respective wheels of an axle 19F, 19R. It is to be understood that in the case of the embodiment of FIG. 1, an amount of torque coupling between rear wheels 14, 15 may be adjusted by adjusting the relative amounts of pressure applied to respective left and right clutches 27. If both clutches 27 are substantially fully closed, relative rotation of rear wheels 14, 15 will be substantially prevented. If under such conditions the amount of pressure applied to one of the clutches 27 is momentarily reduced, a decrease in drive torque applied to the wheel driven by that clutch 27 will take place. Also, a corresponding increase in drive torque applied through the other of the clutches will occur, resulting in a momentary increase in drive torque applied to the other wheel of the rear axle 19R.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle controller, the controller being configured to:
   receive a drive demand signal indicative of an amount of net drive to be applied to one or more driving wheels of a vehicle;
   estimate a value of a parameter indicative of a surface coefficient of friction between one or more driving wheels and a driving surface, surface_friction; and
   cause the application of a net torque to one or more wheels of a vehicle, an amount of net torque applied being determined in dependence at least in part on the received drive demand signal, the net torque being a difference between a positive drive torque and a negative brake torque applied to the or each wheel,
   the controller being configured automatically to increase momentarily an amount of net torque applied to a driving wheel independently of the drive demand signal and to update an estimate of parameter surface_friction in dependence at least in part on a change in speed of said driving wheel when the amount of net torque applied to said at least one driving wheel is increased,
   wherein increasing momentarily an amount of drive torque applied to the driving wheel and updating an estimate of parameter surface_friction comprises:
      causing the application of positive drive torque and negative brake torque to the driving wheel substantially simultaneously;
      increasing momentarily an a amount of net positive torque applied by momentarily reducing the amount of brake torque applied to the driving wheel;
      measuring the speed of the driving wheel when the amount of brake torque applied to the driving wheel is reduced; and
      updating said estimate of parameter surface_friction based at least in part on the measured speed of the driving wheel.

2. A method of controlling a motor vehicle comprising:
   receiving a drive demand signal indicative of an amount of net drive to be applied to one or more driving wheels of a vehicle;
   estimating a value of a parameter indicative of a surface coefficient of friction between one or more driving wheels and a driving surface, surface_friction; and
   applying a net torque to one or more wheels of a vehicle, an amount of net torque applied being determined in dependence at least in part on the received drive demand signal, the net torque being a difference between a positive drive torque and a negative brake torque applied to the or each wheel,
   the method comprising automatically increasing momentarily an amount of net torque applied to a driving wheel independently of the drive demand signal and updating an estimate of parameter surface_friction in dependence at least in part on a change in speed of said driving wheel when the amount of net torque applied to said driving wheel is increased,
   wherein increasing momentarily an amount of net torque applied to the driving wheel and updating an estimate of parameter surface_friction comprises:
      causing application of positive drive torque and negative brake torque to the driving wheel substantially simultaneously;
      increasing momentarily an amount of net positive torque applied by momentarily reducing the amount of brake torque applied to the driving wheel;

measuring the speed of the driving wheel when the amount of brake torque applied to the driving wheel is reduced; and updating said estimate of parameter surface_friction based at least in part on the measured speed of the driving wheel.

3. A controller according to claim 1 wherein the controller is configured to cause the application of a net torque to one or more wheels of a vehicle by controlling an amount of torque coupling between first and second axles of a vehicle, the controller being configured automatically to increase momentarily an amount of net torque applied to a driving wheel of a second axle at least in part by momentarily reducing an amount of torque coupling between the first and second axles of the vehicle.

4. A controller according to claim 1 wherein the controller is configured to cause the application of a net torque to one or more wheels of a vehicle by controlling an amount of torque coupling between respective wheels of an axle of a vehicle, the controller being configured automatically to increase momentarily an amount of net torque applied to a driving wheel of an axle at least in part by momentarily adjusting an amount of torque coupling between respective wheels of an axle.

5. A controller according to claim 1 configured to determine the amount of net torque to be applied to one or more driving wheels in dependence at least in part on the drive demand signal and the value of surface_friction.

6. A controller according to claim 5 configured to determine the amount of net torque to be applied to one or more driving wheels such that an amount of slip of one or more driving wheels is substantially equal to a predetermined amount.

7. A controller according to claim 6 wherein the predetermined amount is determined in dependence at least in part on the value of surface_friction and a speed of a vehicle.

8. A control system comprising a controller according to claim 1.

9. A control system according to claim 8 configured to determine the amount of net torque to be applied to one or more driving wheels in dependence at least in part on information indicative of a terrain over which a vehicle is driving.

10. A control system according to claim 9 configured to receive information indicative of a terrain over which a vehicle is driving by receiving a signal indicative of the identity of an operating mode in which a vehicle is operating, the operating mode being selected from a plurality of operating modes.

11. A control system according claim 10 wherein the operating modes are control modes of at least one subsystem of a vehicle, the control system having a subsystem controller for initiating control of a vehicle subsystem in the selected one of the plurality of subsystem control modes, each one of the operating modes corresponding to one or more different driving conditions for a vehicle.

12. A control system according to claim 11 wherein the system comprises a processor configured to evaluate one or more driving condition indicators to determine the extent to which each of the subsystem control modes is appropriate.

13. A control system according to claim 12 operable in an automatic operating mode selection condition in which the system is configured automatically to control the subsystem controller to initiate control of the or each subsystem in the subsystem control mode which is most appropriate.

14. A control system according to claim 11 wherein in each operating mode the system is configured to cause each one of a plurality of vehicle subsystems to be operated in a subsystem configuration mode appropriate to the driving condition.

15. A control system according to claim 14 wherein the operating modes include one or more control modes selected from the following:

control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

16. A processor arranged to implement the method of claim 2.

17. A vehicle comprising a chassis, a body attached to said chassis, a plurality of wheels, a powertrain to drive said wheels, a braking system to brake said wheels, and a controller according to claim 1.

18. A method according to claim 2 wherein:
said drive demand signal comprises a torque demand signal.

\* \* \* \* \*